(12) United States Patent
Nishikawa et al.

(10) Patent No.: US 7,315,114 B2
(45) Date of Patent: Jan. 1, 2008

(54) DISPLAY APPARATUS PROVIDED WITH A LIGHT-EMITTING GLASS FACE PANEL HAVING AN INNER SURFACE COATED WITH A PHOSPHOR LAYER

(75) Inventors: Masaki Nishikawa, Chiba (JP); Hidetsuga Matsukiyo, Chiba (JP)

(73) Assignee: Hitachi Displays, Ltd., Tokyo (JP)

( * ) Notice: Subject to any disclaimer, the term of this patent is extended or adjusted under 35 U.S.C. 154(b) by 523 days.

(21) Appl. No.: 11/057,821

(22) Filed: Feb. 14, 2005

(65) Prior Publication Data
US 2005/0179356 A1    Aug. 18, 2005

(30) Foreign Application Priority Data
Feb. 17, 2004    (JP)    ............................. 2004-039996

(51) Int. Cl.
*H01J 61/62* (2006.01)
*H01J 63/04* (2006.01)

(52) U.S. Cl. .................. 313/480; 313/477 R; 313/461; 313/467; 313/469; 313/110; 313/485

(58) Field of Classification Search ............... 313/461, 313/477 R, 478–480, 467, 469
See application file for complete search history.

(56) References Cited

U.S. PATENT DOCUMENTS

| | | | | |
|---|---|---|---|---|
| 3,634,711 A | * | 1/1972 | Barber et al. ............... | 313/468 |
| 4,134,851 A | * | 1/1979 | Klein et al. ........... | 252/301.4 P |
| 4,405,881 A | * | 9/1983 | Kobayashi ................. | 313/480 |
| 4,581,561 A | * | 4/1986 | Palac ........................ | 313/474 |
| 2004/0212302 A1 | * | 10/2004 | Letz et al. ................. | 313/512 |

\* cited by examiner

*Primary Examiner*—Mariceli Santiago
(74) *Attorney, Agent, or Firm*—Milbank, Tweed, Hadley & McCloy LLP

(57) ABSTRACT

A display apparatus includes a face plate that constitutes a part of a vacuum envelope, a phosphor layer formed on an inner surface of the face plate, and an electron beam source that emits electron beams to the phosphor layer. The face plate includes a light-emitting glass layer containing a light-emitting substance that emits light when electron beams are projected thereon. By extracting energy of electron beams, which have reached the face plate, as light, it is possible to reduce browning that occurs in the face plate and improve brightness of a display image significantly.

10 Claims, 13 Drawing Sheets

DISPLAY APPARATUS PROVIDED WITH A LIGHT-EMITTING GLASS FACE PANEL HAVING AN INNER SURFACE COATED WITH A PHOSPHOR LAYER

BACKGROUND OF THE INVENTION

1. Field of the Invention

The present invention relates to a display apparatus, and in particular to a display apparatus in which a coloring phenomenon of a panel glass due to irradiation of electron beams is controlled.

2. Description of the Related Art

As a display apparatus, for example, there is a projection television apparatus using projection cathode ray tubes. In the projection television apparatus, three projection cathode ray tubes for a green image, a blue image, and a red image are arranged in positions a predetermined distance apart from a projection screen and reproduced images, which are displayed on face plates of the three projection cathode ray tubes, are superimposed one on top of another on a projection screen through a projection lens to display a color image.

The projection cathode ray tube of this type includes a vacuum envelope of glass. The vacuum envelope includes a panel section having a face plate, a cylindrical neck section having an electron gun housed therein, and a funnel section connecting the panel section and the neck section.

The projection cathode ray tube has a phosphor layer on an inner surface of the face plate of the panel section. High density electron beams emitted from the electron gun are deflected by vertical and horizontal deflection magnetic fields formed by deflection yokes to two-dimensionally scan the surface of the phosphor layer. Light generated by collision of the electron beams against phosphors is expanded and projected on the projection screen by the projection lens.

In the projection cathode ray tube of this type, when high density electron beams are projected on a fluorescent film, some electron beams do not hit phosphor particles in the phosphor layer and do not contribute to light emission of the phosphors. In other words, the electron beams may collide against the face plate directly. Some electrons are transmitted through the phosphors while scattering among the phosphor particles and projected on the phase plate. Consequently, the face plate itself is tinged with brown when the electron beams are projected on the face plate. This is a phenomenon called browning.

The browning occurs in the face plate because a relatively large number of electrons, which do not contribute to light emission of the phosphor particles, are present in the electron beams and projected on the face plate as described above. Thus, it is difficult to obtain a projection cathode ray tube having a bright display image.

When such browning occurs in the face plate, the phase plate absorbs, in particular, light in green to blue regions. Therefore, the browning is a factor that prevents a prolonged life of a projection cathode ray tube for green and a projection cathode ray tube for blue.

Note that such browning occurs not only in the projection cathode ray tube but also cathode ray tubes of a field emission image display apparatus, a display monitor tube, a television receiver, and the like, a cathode ray tube that does not have a phosphor layer on an inner surface of a panel glass, a cathode ray tube that has a layer other than the phosphor layer, and the like.

JP-A-7-262932 discloses a technique for coping with this type of browning. JP-A-7-262932 discloses a cathode ray tube in which an oxide film, which does not contain alkali and does not contain ions that obtain substantial reducibility due to impact of electron beams, is formed between an inner surface of a face plate of a panel section and a phosphor layer, and this oxide film has a thickness sufficient for preventing electron beams from penetrating through the oxide film to reach the face plate and does not have a color that is so dark as to prevent desired color coordinate specifications.

JP-A-8-31344 discloses another technique for coping with the browning. JP-A-8-31344 discloses a funnel for a beam index cathode ray tube that is attached with a light-receiving element, which detects index light from an index stripe formed on a fluorescent surface on an inner surface of a face plate of a panel section, on an outer surface side thereof. The funnel for a beam index cathode ray tube consists of non-leaden glass containing 0.1 to 2 weight % of $CeO_2$ and having an X-ray absorption coefficient of 28 $cm^{-1}$ or more at a wavelength of 0.6 Å.

In the cathode ray tube described in JP-A-7-262932, an oxide layer with high durability against electron beams is formed on an inner surface of the face plate of the panel section, whereby occurrence of discoloration (browning) of the faceplate due to collision of high-energy electron beams is prevented. However, efficiency of use of electron beams is not improved.

In the funnel for a beam index cathode ray tube described in JP-A-8-31344, a glass material constituting the funnel is formed by mixing cerium oxide with high durability against electron beams therein, whereby decline in a light transmittance of a light-receiving window portion due to the browning phenomenon is prevented. However, as in the JP-A-7-262932, efficiency of use of electron beams is not improved.

SUMMARY OF THE INVENTION

The invention has been devised in order to solve the conventional problems described above. The invention can provide a display apparatus in which discoloration of a face plate is reduced and decline in luminance due to the browsing phenomenon is prevented to obtain high-luminance light emission.

The invention can provide a display apparatus that uses electron beam energy effectively to thereby reduce a burden on phosphors and improve a product life significantly.

In the display apparatus according to the invention, a face plate having visible light transmission properties, on an inner surface of which a phosphor layer is formed, contains a light-emitting material that is excited by electron beams to emit light. Electrons, which have reached the face plate, excite a light-emitting central material added to the face plate and convert energy of the light-emitting central material into light. Thus, it is possible to solve the problems of the background art.

Preferably, in the constitution described above, a concentration of the light-emitting material in the face plate is higher on an inner surface side than on an outer surface side.

Preferably, in the constitution described above, a light-emitting area is set within 50 µm from a side close to a side of formation of the phosphor layer on the inner surface of the face plate. Consequently, it is possible to extract electron beam energy, which is injected into the face plate by electron beam projection, as a light emission color.

Preferably, in the constitution described above, the light-emitting material is $Eu^{3+}$ and phosphors constituting the phosphor layer are red light-emitting phosphors. Consequently, it is possible to extract electron beam energy, which is injected into the face plate by electron beam projection, as a red light emission color approximate to a light emission color of the phosphors.

Preferably, in the constitution described above, the light-emitting material is $Tb^{3+}$ and phosphors constituting the phosphor layer are green light-emitting phosphors. Consequently, it is possible to extract electron beam energy, which is injected into the face plate by electron beam projection, as a green light emission color approximate to a light emission color of the phosphors.

Preferably, in the constitution described above, the light-emitting material is $Tm^{3+}$ and phosphors constituting the phosphor layer are blue light-emitting phosphors Consequently, it is possible to extract electron beam energy, which is injected into the face plate by electron beam projection, as a blue light emission color approximate to a light emission color of the phosphors.

Preferably, in the constitution described above, an uneven surface is provided on the inner surface of the face plate. Consequently, it is possible to extract electron beam energy, which is injected into the face plate by electron beam projection, as a high luminance light emission color.

Preferably, in the constitution described above, a portion where the light-emitting material is formed in the face plate is associated with a light emission color of each phosphor layer. Consequently, it is possible to extract electron beam energy, which is injected into the face plate by electron beam projection, as a corresponding light emission color.

Note that the invention is not limited to the constitutions described above and constitutions described in embodiments to be described later. Various modifications of the constitutions are possible without departing from the technical idea of the invention.

DESCRIPTION OF THE PREFERRED EMBODIMENT

Specific embodiments of the invention will be hereinafter explained in detail with reference to the accompanying drawings.

First Embodiment

Figure 1:
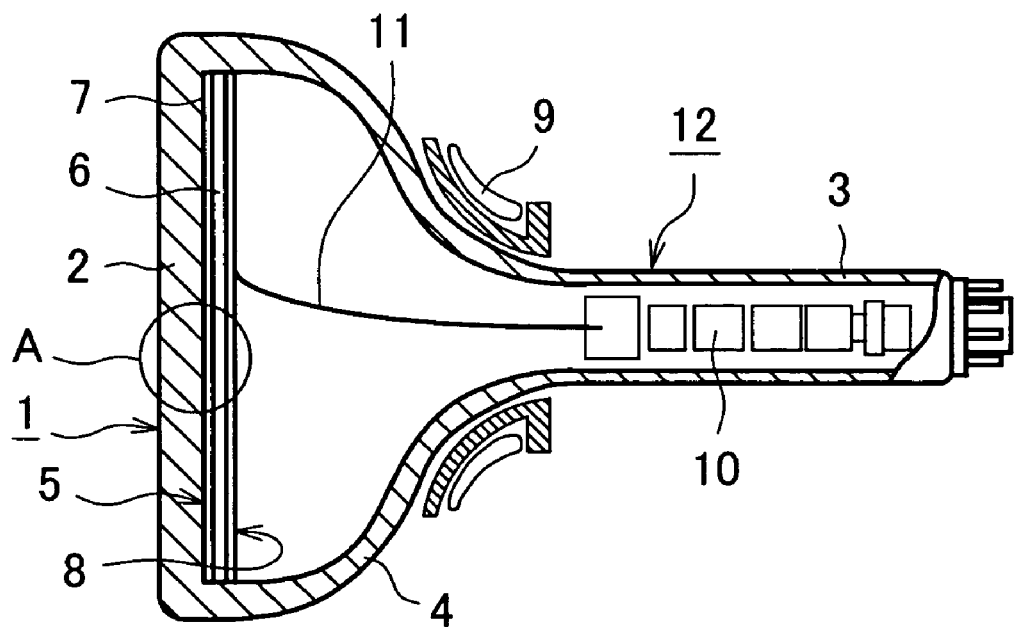
FIG. 1 is a main part sectional view showing a structure of a projection cathode ray tube according to a first embodiment of a display apparatus according to the invention.

FIG. 1 is a main part sectional view illustrating a structure of a projection cathode ray tube according to a first embodiment of a display apparatus according to the invention. In FIG. 1, reference numeral 1 denotes a panel section; 2, a face plate that transmits visible light; 3, a neck section; 4, a funnel section; 5, a fluorescent screen; 6, a phosphor layer; 7, a reflection film that reflects electron beams; 8, an aluminum evaporated film; 9, a deflection yoke; 10, an electron gun; 11, an electron beam projected from the electron gun 10; and 12, a projection cathode ray tube. The display apparatus of the invention is a cathode luminescent display apparatus that is excited by electron beams. Note that, in this embodiment, visible light is defined as light having a wavelength of 400 nm to 770 nm.

A vacuum envelope (a bulb) of glass constituting this projection cathode ray tube 12 includes: the panel section 1 that has the large aperture translucent face plate 2; the long cylindrical neck section 3 that has the electron gun 10 housed therein; and the funnel section 4 that connects the panel section 1 and the neck section 3.

The panel section 1 includes: the fluorescent screen 5 that consists of a two layer structure of the phosphor layer 6 and the reflection film 7 formed on an inner surface of the face plate 2 ; and the aluminum evaporated film 8 formed on the fluorescent screen 5.

Here, the phosphor layer 6 constitutes a single color fluorescent film of green when the projection cathode ray tube 12 is a projection cathode ray tube for a green image, constitutes a single color fluorescent film of blue when the projection cathode ray tube 12 is a projection cathode ray tube for a blue image, and constitutes a single color fluorescent film of red when the projection cathode ray tube 12 is a projection cathode ray tube for a red image.

The reflection film 7 is provided between the inner surface of the face plate 2 and the phosphor layer 6 and constituted to show a high reflection characteristic with respect to the electron beam 11 projected from the electron gun 10. In addition, the reflection film 7 is, for example, a thin film of a metal compound of bismuth oxide ($Bi_2O_3$) with an average thickness of about 0.2 μm. The deflection yoke 9 is mounted on an outer side of a portion where the neck section 3 and the funnel section 4 are connected. One electron beam 11 projected from the electron gun 10 is scanned and deflected in a predetermined direction by the deflection yoke 9 and, then, collides against the fluorescent screen 5.

An image display operation in the projection cathode ray tube 12 according to the structure described above is almost the same as an image display operation in a known projection cathode ray tube. An operation of a projection television apparatus, which uses a projection cathode ray tube for green image display, a projection cathode ray tube for blue image display, and a projection cathode ray tube for red image display to project display images thereof on a projection screen in a synthesized state and display an enlarged synthesized color image, is the same as an operation of a known projection television apparatus. Thus, explanations of these operations are omitted.

Figure 2:
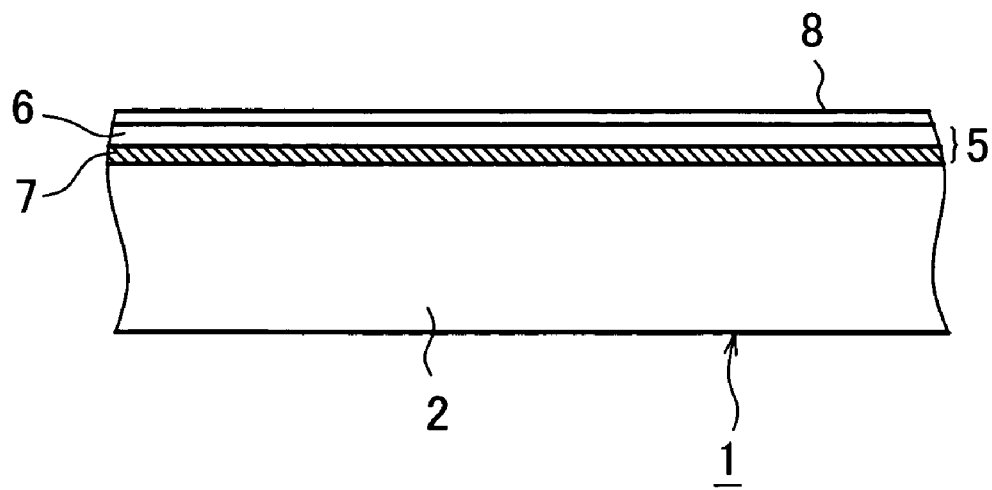
FIG. 2 is an enlarged sectional view showing a part A of the projection cathode ray tube in FIG. 1.

FIG. 2 is an enlarged sectional view showing a specific structure of a part A of the face plate 2 and the fluorescent screen 5 of the projection cathode ray tube shown in FIG. 1. In FIG. 2, components identical with those in FIG. 1 are denoted by the identical reference numerals. In FIG. 2, the reflection film 7 formed on the inner surface of the face plate 2 and the phosphor layer 6 of green, blue, or red provided on the reflection film 7 are arranged on the inner surface of the face plate 2. In this case, the reflection film 7 is, for example, a thin film with an average thickness of about 02 μm containing bismuth oxide ($Bi_2O_3$) as a main component. As described above, the single color phosphor layer 6 consists of a single color fluorescent film of green, a single color fluorescent film of blue, or a single color fluorescent film of red. Even if the reflection film 7 for reflecting the electron beam 11 is formed, some electrons pass through the reflection film 7.

Figure 3:
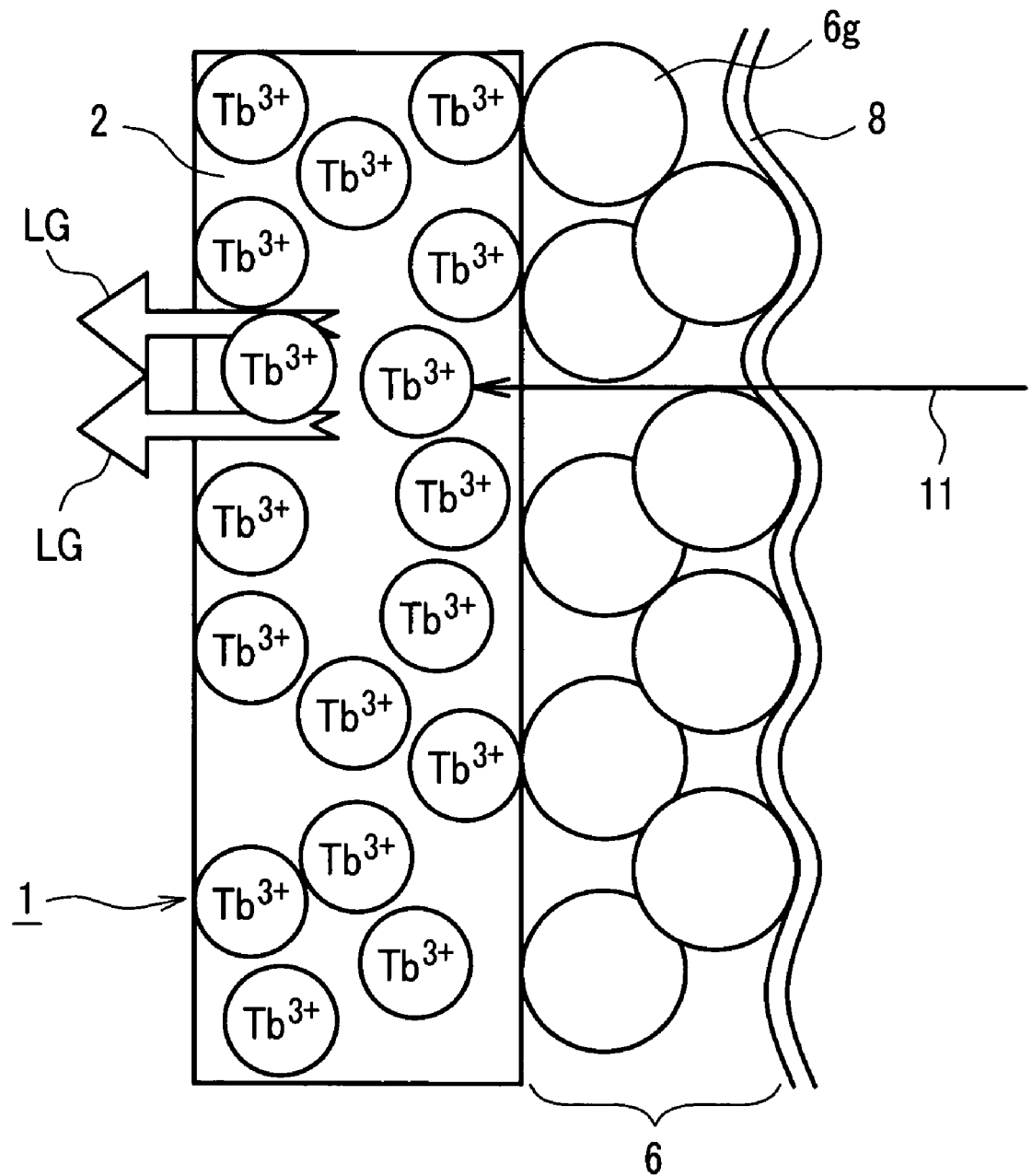
FIG. 3 is a main part enlarged sectional view illustrating a concept of development of green light emission by electron beam projection on a face plate that is formed by adding a light-emitting substance containing $Tb^{3+}$ to a face plate glass material.

FIG. 3 is a main part enlarged sectional view illustrating a specific structure of the projection cathode ray tube according to the first embodiment shown in FIG. 1. Components identical with those in FIG. 2 are denoted by the identical reference numerals. In FIG. 3, the face plate 2 is a molded product of a light-emitting glass material added with a light-emitting substance that emits light by itself when the electron beam 11 is projected thereon. A content of the light-emitting substance of the light-emitting glass used for the face plate 2 is about 5 mol %. The light-emitting substance contains $Tb^{3+}$. By adding the light-emitting substance containing $Tb^{3+}$ to a glass material for a panel, the face plate 2 presents green light emission LG when the electron beam 11 collides against the face plate 2. A glass bulb for a 7 inch projection cathode ray tube was formed by joining the face plate 2 and the funnel section 4. A projection cathode ray tube was manufactured using this glass bulb through a usual projection cathode ray tube manufacturing process.

Figure 4:
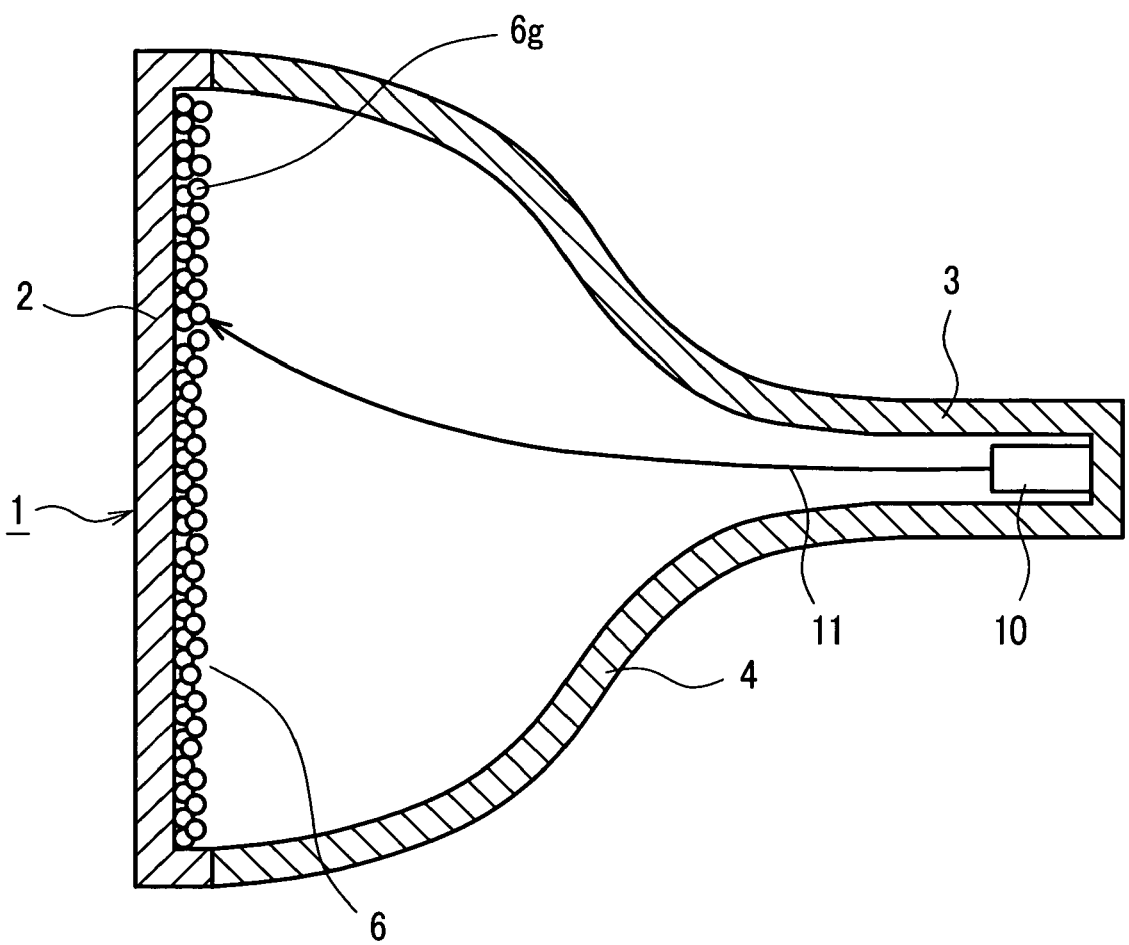
FIG. 4 is a main part sectional view showing a specific structure of the projection cathode ray tube according to the first embodiment of the invention.

FIG. 4 is a main part sectional view of a structure of the projection cathode ray tube manufactured in this embodiment. The phosphor layer 6 was formed by a sedimentation application method with a mixture of barium acetate and water glass using $Y_2SiO_5$:Tb green light-emitting phosphors 6g with an average particle diameter of about 6 μm. In FIG. 4, the Al evaporated film 8 is not shown.

The projection cathode ray tube manufactured in this way and a conventional projection cathode ray tube were driven under conditions of an acceleration voltage of about 31 kV, an electron beam irradiation area of 102×76 mm² (5 inch raster), and an electric current of about 700 μA. As a result, an initial luminance of the projection cathode ray tube manufactured in this embodiment was about 1.05 times as high as an initial luminance of the conventional projection cathode ray tube. When a degree of decline in a luminance of the conventional projection cathode ray tube was assumed to be 1, a degree of decline in a luminance of the projection cathode ray tube after being driven for about 5000 hours could be reduced to about 0.85 times as high as the degree of decline in a luminance of the conventional projection cathode ray tube. The reflection film 7 is not formed on the inner surface of the panel section 1 shown in FIGS. 3 and 4. It is possible to further control the browning by providing a reflection film between the face plate 2 and the phosphor layer 6 of the panel section 1 shown in FIGS. 3 and 4.

Second Embodiment

Figure 5:
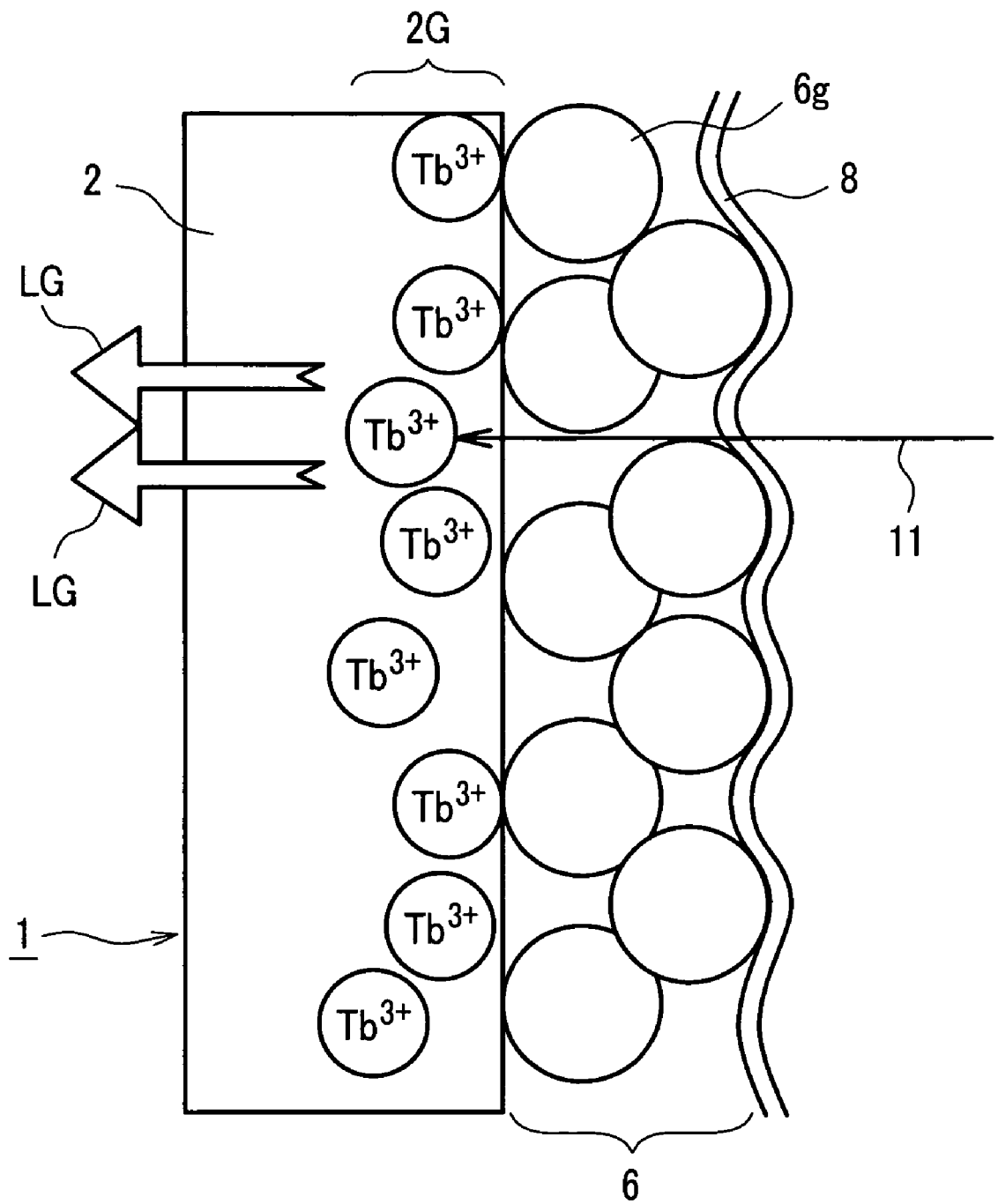
FIG. 5 is a main part sectional view showing a structure of a projection cathode ray tube according to a second embodiment of the invention.

FIG. 5 is a main part sectional view illustrating a structure of a projection cathode ray tube according to a second embodiment of the display apparatus according to the invention. In FIG. 5, functional components identical with those in FIG. 4 are denoted by the identical reference numerals and signs and explanations of the functional components are omitted. A face plate 2 of glass used in the projection cathode ray tube may be added with $Tb^{3+}$ on an inner side thereof by an ion implantation method. In such a structure, the light-emitting substance $Tb^{3+}$, which acts as a light emission center, is present at a high concentration on the inner surface side of the face plate 2. A light-emitting glass layer 2G, which contains the light-emitting substance containing $Tb^{3+}$ on the inner surface side of the face plate 2, presents green light emission when the electron beam 11 collides against the light-emitting glass layer 2G.

As in the first embodiment, the face plate 2, on the inner surface of which the light-emitting glass layer 2G was formed, and the funnel section 4 were joined to form a glass bulb for a 7 inch projection cathode ray tube. A projection cathode ray tube was manufactured using this glass bulb through the usual projection cathode ray tube manufacturing process. The phosphor layer 6 was formed by the sedimentation application method with a mixture of barium acetate and water glass using $Y_2SiO_5$:Tb green light-emitting phosphors 6g with an average particle diameter of about 6 μm.

The projection cathode ray tube manufactured in this way and a conventional projection cathode ray tube were driven under conditions of an acceleration voltage of about 31 kV, an electron beam irradiation area of 102×76 mm² (5 inch raster), and an electric current of about 700 μA. As a result, an initial luminance of the projection cathode ray tube manufactured in this embodiment was about 1.05 times as high as an initial luminance of the conventional projection cathode ray tube. When a degree of decline in a luminance of the conventional projection cathode ray tube after being driven for about 5000 hours was assumed to be 1, a degree of decline in a luminance of the projection cathode ray tube after being driven for about 5000 hours could be reduced to about 0.85 times as high as the degree of decline in a luminance of the conventional projection cathode ray tube.

Third Embodiment

Figure 6:
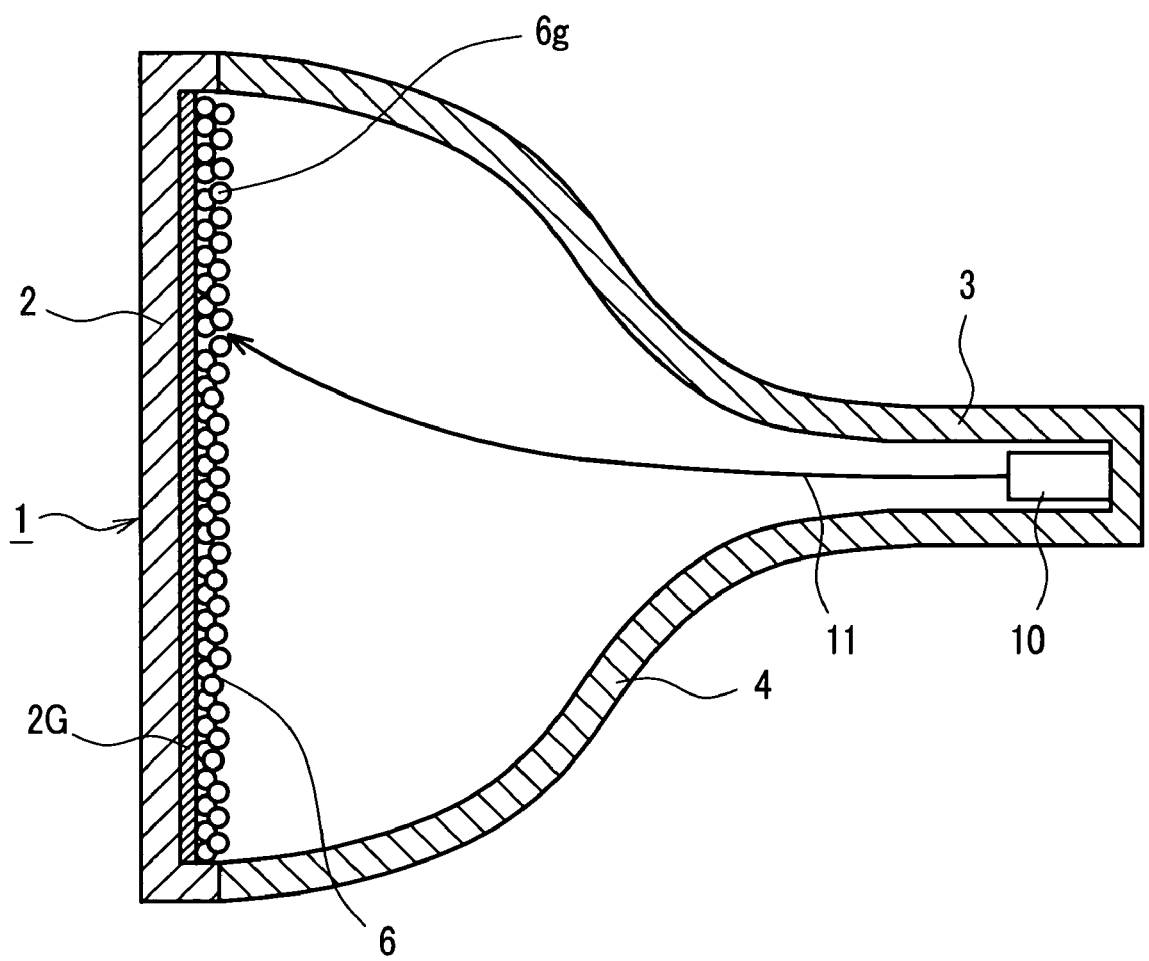
FIG. 6 is a main part sectional view showing a structure of a projection cathode ray tube according to a third embodiment of the invention.

FIG. 6 is a main part sectional view illustrating a structure of a projection cathode ray tube according to a third embodiment of the display apparatus according to the invention. In FIG. 6, functional components identical with those in FIG. 4 are denoted by the identical reference numerals and signs and explanations of the functional components are omitted. In FIG. 6, the face plate 2 of glass used in the projection cathode ray tube has the light-emitting glass layer 2G on the inner surface thereof. The light-emitting glass layer 2G is added with about 5 mol % of a light-emitting substance containing $Tb^{3+}$. The light-emitting glass layer 2G added with $Tb^{3+}$, which is formed on the inner surface side of the face plate 2, presents green light emission when the electron beam 11 collides against the light-emitting glass layer 2G. Note that the light-emitting glass layer 2G was formed by a sol-gel method.

As in the first embodiment, a glass bulb for a projection cathode ray tube was manufactured, a projection cathode ray tube was manufactured using the glass bulb through a usual projection cathode ray tube manufacturing process, and the projection cathode ray tube was driven under conditions identical with those in the first embodiment.

The phosphor layer 6 was formed by the sedimentation application method with a mixture of barium acetate and water glass using $Y_2SiO_5$:Tb green light-emitting phosphors 6g with an average particle diameter of about 6 μm. Note that, in FIG. 6, the Al evaporated film 8 is not shown.

Figure 7:
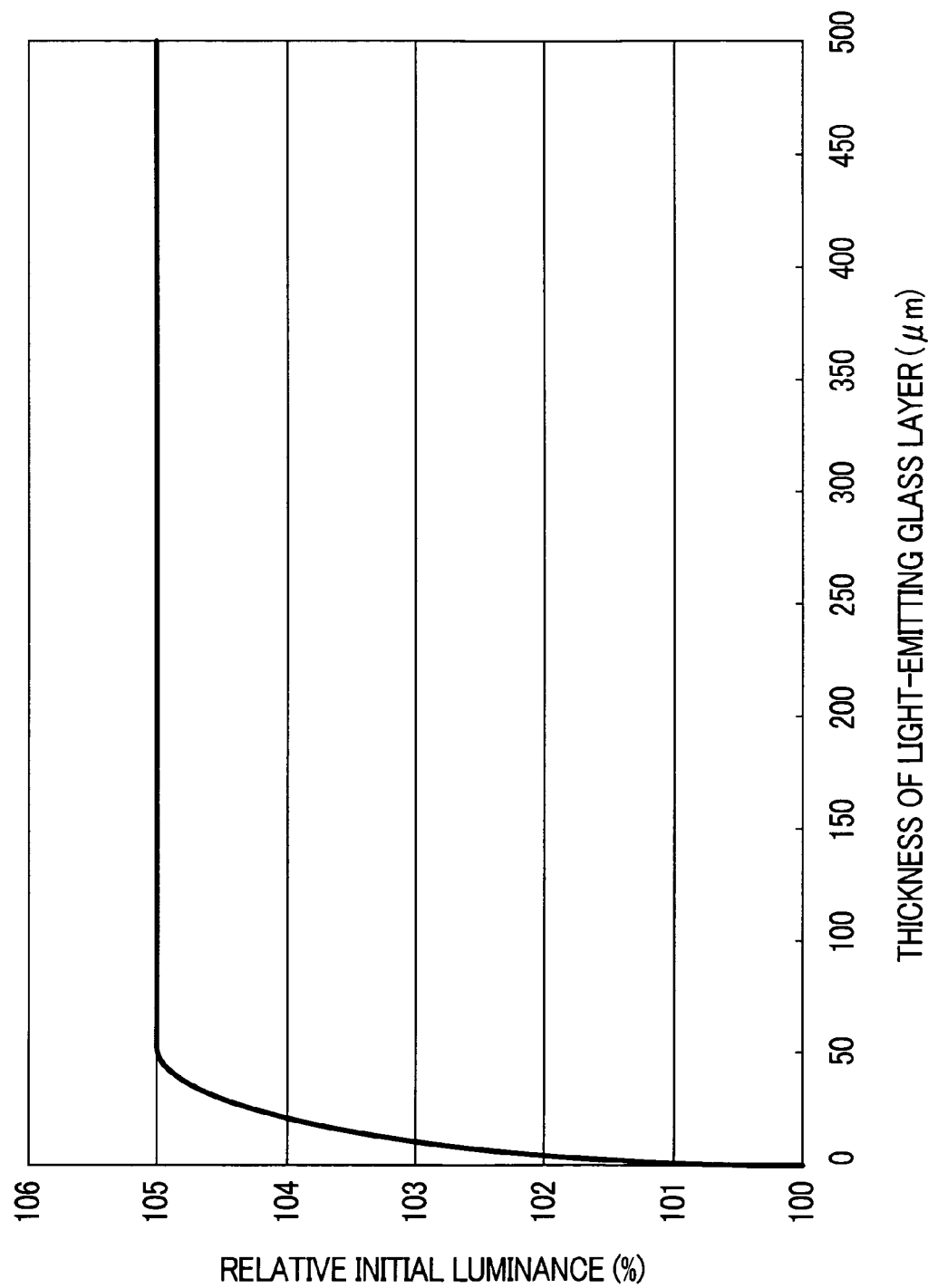
FIG. 7 is a graph representing a relation of a relative initial luminance to a thickness of a light emission glass layer.

FIG. 7 is a graph representing a relation between a relative initial luminance ((an initial luminance of a cathode ray tube in which a light-emitting glass layer is formed/an initial luminance of a cathode ray tube without a light-emitting glass layer)×100%) and a thickness of the light-emitting glass layer. By forming the light-emitting glass layer 2G, an initial luminance of the projection cathode ray tube could be improved compared with that of the conventional projection cathode ray tube. Table 1 shown below indicates a degree of decline in a luminance after the projection cathode ray tube is driven for about 5000 hours. In this embodiment in which a degree of decline in a luminance of the conventional projection cathode ray tube was assumed to be 1, eight kinds of cathode ray tubes were manufactured and the light-emitting glass layers 2G were formed with thicknesses of about 10, 20, 30, 50, 70, 100, 300, and 500 μm, respectively. The degree of decline in a luminance could be reduced as shown in Table 1 below according to the thicknesses of the respective light-emitting glass layers 2G.

a crack was confirmed at a thickness of about 300 μm or more. Preferably, the thickness of the glass layer 2G is about 200 μm or less.

Fourth Embodiment

Figure 8:
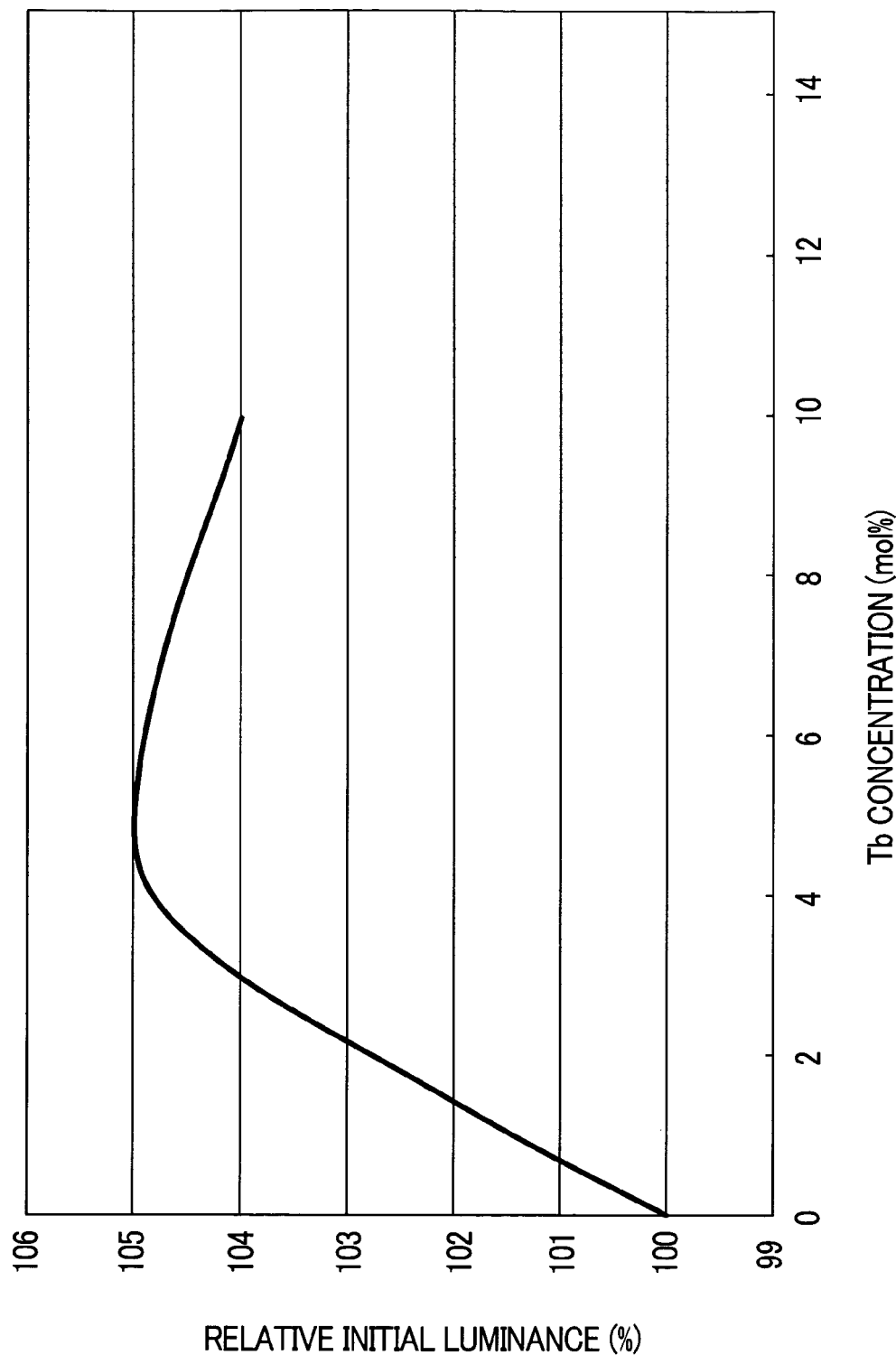
FIG. 8 is a graph representing a relation of a relative initial luminance to a Tb concentration.

FIG. 8 is a graph representing a relation between a relative initial luminance and a Tb concentration in a light-emitting glass layer. In this embodiment, seven kinds of cathode ray tubes were manufactured. The light-emitting glass layer G2 was formed with a thickness of about 50 μm on the inner surface of the face plate 2 of glass, which was used in the projection cathode ray tube, by the sol-gel method. Seven kinds of face plates were manufactured, and the light-emitting glass layers 2G of the face plates contain $Tb^{3+}$ of about 1 mol %, 3 mol %, 5 mol %, 7 mol %, 10 mol %, 15 mol %, and 20 mol %, respectively. The light-emitting glass layer 2G added with the light-emitting substance containing $Tb^{3+}$, which is formed on the inner surface side of the face plate 2, presents green light emission when the electron beam 11 collides against the light-emitting glass layer 2G.

However, the light-emitting glass layers 2G containing about 15 mol % and about 20 mol % of the light-emitting substance, which contained $Tb^{3+}$, lost transparency. In this embodiment, as in the first embodiment, a glass bulb for a projection cathode ray tube was formed for the face plates 2 having the light-emitting glass layers 2G containing about 1, 3, 5, 7, and 10 mol % of $Tb^{3+}$. A projection cathode ray tube was manufactured using the glass bulb through a usual projection cathode ray tube manufacturing process, and the projection cathode ray tube was driven under conditions identical with those in the first embodiment.

As shown in FIG. 8, an initial luminance of a projection cathode ray tube having the light-emitting glass layer 2G is improved compared with an initial luminance of a conventional projection cathode ray tube. Table 2 shown below indicates a degree of decline in a luminance after the projection cathode ray tube is driven for about 5000 hours. A degree of decline in a luminance of the conventional projection cathode ray tube was assumed to be 1. The degree

TABLE 1

| | Specifications of light-emitting glass | | | | | | | | Conventional face plate |
|---|---|---|---|---|---|---|---|---|---|
| Thickness of light-emitting glass layer (μm) | 10 | 20 | 30 | 50 | 70 | 100 | 300 | 500 | None |
| Degree of decline in luminance (relative value) | 0.90 | 0.87 | 0.86 | 0.85 | 0.85 | 0.85 | 0.85 | 0.85 | 1.00 |

As it is evident from FIG. 7 and Table 1, it was found that an effect of the light-emitting glass layer 2G was the same when the thickness of the light-emitting glass layer 2G was about 50 μm or more. This is because an arrival distance of electron beams to the inside of the light-emitting glass layer 2G is about 50 μm or less. Therefore, it is seen that at least about 50 μm is sufficient as the thickness of the light-emitting glass layer 2G. Note that these values are values obtained as a result of performing an experiment at an acceleration voltage of about 31 kV. When the acceleration voltage is lower, the thickness of the light-emitting glass layer 2G may be further reduced to about 50 μm or less.

If the thickness of the light-emitting glass layer 2G is increased when the layer is formed by the sol-gel method, the light-emitting glass layer 2G cracks. In this embodiment, of decline in a luminance after about 5000 hours could be reduced as shown in Table 2 according to a concentration of $Tb^{3+}$. In order to maintain transparency, it is desirable to set the concentration of $Tb^{3+}$ to about 10 mol % or less and, as it is seen from FIG. 8 and Table 2, it is more desirable to set the concentration to about 3 mol % to about 10 mol % at which a higher effect is obtained.

TABLE 2

| | Specifications of light-emitting glass | | | | | Conventional face plate |
|---|---|---|---|---|---|---|
| $Tb^{3+}$ concentration (mol %) | 1 | 3 | 5 | 7 | 10 | None |

TABLE 2-continued

|  | Specifications of light-emitting glass |  |  |  |  | Conventional face plate |
|---|---|---|---|---|---|---|
| Degree of decline in luminance (relative value) | 0.90 | 0.87 | 0.85 | 0.85 | 0.85 | 1.00 |

Fifth Embodiment

Figure 9:
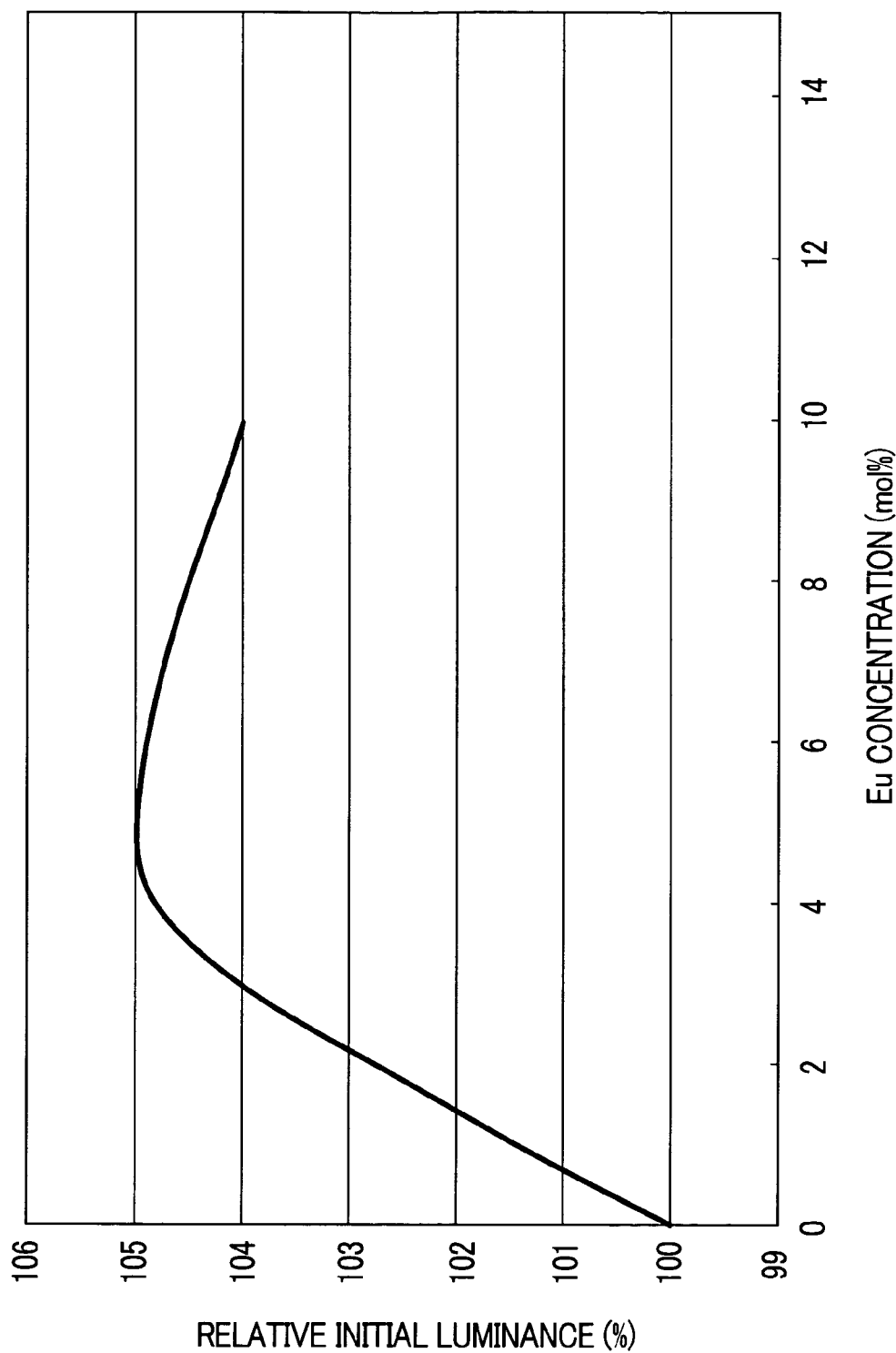
FIG. 9 is a graph representing a relation of a relative initial luminance to an Eu concentration.

FIG. 9 is a graph representing a relation between a relative initial luminance and a Tb concentration in a light-emitting glass. In this embodiment, seven kinds of cathode ray tubes were manufactured. Light-emitting glass layers added with about 1, 3, 5, 7, 10, 15, and 20 mol % of $Eu^{3+}$ were formed with a thickness of about 50 μm on the inner surface of the face plate 2 by the sol-gel method, respectively. The light-emitting glass layer added with $Eu^{3+}$, which is formed on the inner surface side of the face plate 2, presents red light emission when electron beams collide against the light-emitting glass layer. However, the light-emitting glass layers 2G containing about 15 mol % and about 20 mol % of $Eu^{3+}$ lost transparency. As in the first embodiment, a glass bulb for a projection cathode ray tube was formed for the face plates having the light-emitting glass layers added with about 1, 3, 5, 7, and 10 mol % of $Eu^{3+}$. A projection cathode ray tube was manufactured using the glass bulb through a usual projection cathode ray tube manufacturing process, and the projection cathode ray tube was driven under conditions identical with those in the first embodiment.

Note that, in this embodiment, the phosphor layer 6 was formed by the sedimentation application method with a mixture of barium acetate and water glass using $Y_2O_3$:Eu red light-emitting phosphors with an average particle diameter of about 6 μm. An initial luminance of the projection cathode ray tube having the light-emitting glass layers added with about 1, 3, 5, 7, and 10 mol % of $Eu^{3+}$ manufactured in this embodiment could be improved compared with the conventional projection cathode ray tube as evidenced by the relation of a relative initial luminance to a concentration of a light-emitting substance containing $Eu^{3+}$ shown in FIG. 9.

Table 3 shown below indicates a degree of decline in a luminance after the projection cathode ray tube is driven for about 5000 hours. A degree of decline in a luminance of the conventional projection cathode ray tube was assumed to be 1. The degree of decline in a luminance could be reduced as shown in Table 3 according to a concentration of added $Eu^{3+}$ after the projection cathode ray tube was driven for about 5000 hours. It is desirable to set the concentration of $Eu^{3+}$ to about 10 mol % or less such that transparency can be maintained. As it is seen from FIG. 9 and Table 3, it is more desirable to set the concentration of $Eu^{3+}$ in a range of about 3 mol % to about 7 mol % at which a higher effect is obtained.

TABLE 3

|  | Specifications of light-emitting glass |  |  |  |  | Conventional face plate |
|---|---|---|---|---|---|---|
| $Eu^{3+}$ concentration (mol %) | 1 | 3 | 5 | 7 | 10 | None |
| Degree of decline in luminance (relative value) | 0.90 | 0.87 | 0.85 | 0.86 | 0.87 | 1.00 |

Sixth Embodiment

Figure 10:
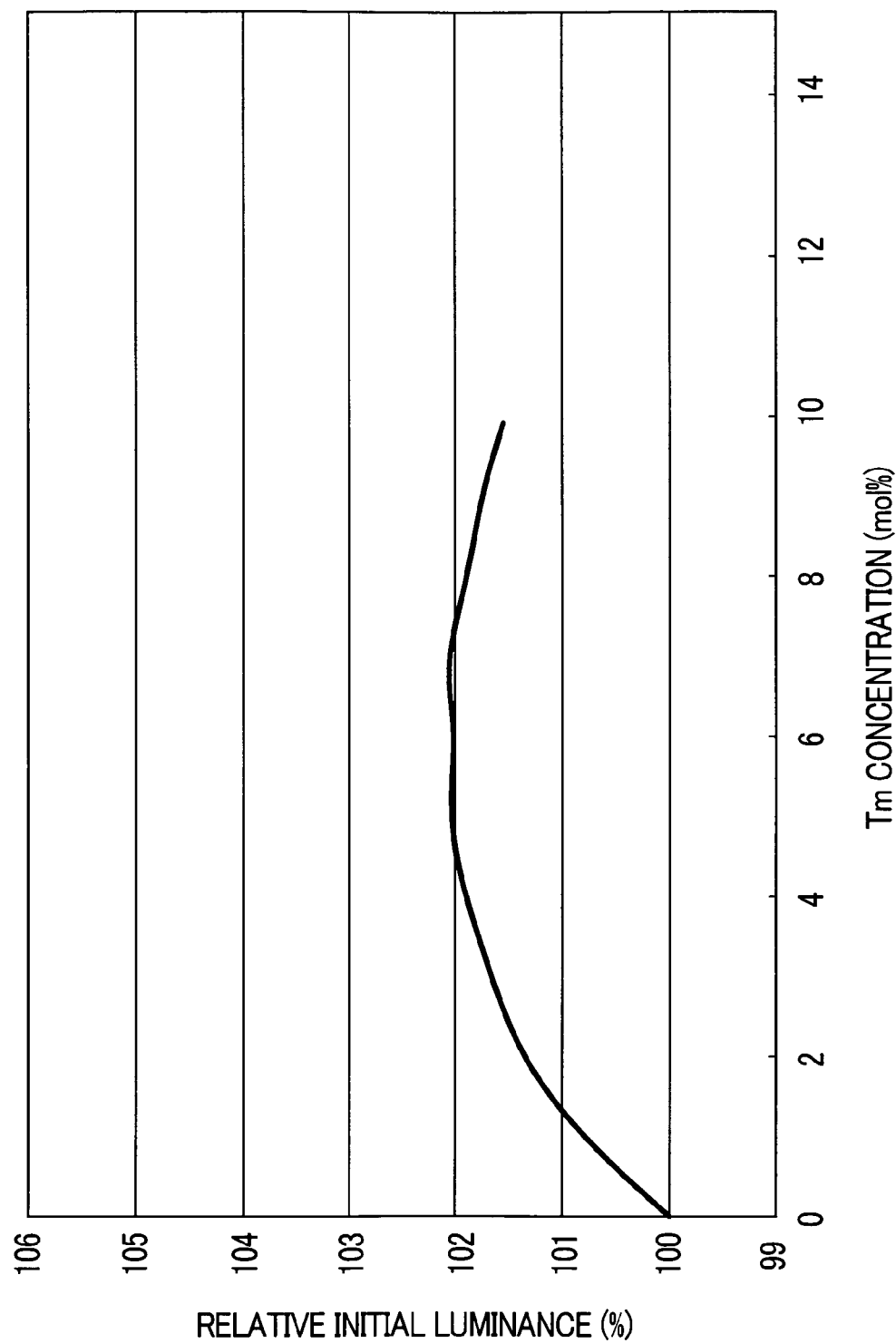
FIG. 10 is a graph representing a relation of a relative initial luminance to a Tm concentration.

FIG. 10 is a graph representing a relation between a relative initial luminance and a Tb concentration in a light-emitting glass. In this embodiment, seven kinds of cathode ray tubes were manufactured. Light-emitting glass layers added with about 1, 3, 5, 7, 10, 15, and 20 mol % of $Tm^{3+}$ were formed with a thickness of about 50 μm on the inner surface of the face plate 2 by the sol-gel method, respectively. The light-emitting glass layer added with $Tm^{3+}$, which is formed on the inner surface side of the face plate 2, presents blue light emission when electron beams collide against the light-emitting glass. However, the light-emitting glass layers added with about 15 mol % and about 20 mol % of the light-emitting substances containing $Tm^{3+}$ lost transparency. As in the first embodiment, a glass bulb for a projection cathode ray tube was formed for the face plates having the light-emitting glass layers added with about 1, 3, 5, 7, and 10 mol % of $Tm^{3+}$. A projection cathode ray tube was manufactured using the glass bulb through a usual projection cathode ray tube manufacturing process, and the projection cathode ray tube was driven under conditions identical with those in the first embodiment.

Note that, in this embodiment, a phosphor film was formed by the sedimentation application method with a mixture of barium acetate and water glass using ZnS:Ag, Al blue light-emitting phosphors with an average particle diameter of about 6 μm. An initial luminance of the projection cathode ray tube having the light-emitting glass layers added with about 1, 3, 5, 7, and 10 mol % of $Tm^{3+}$ manufactured in this embodiment could be improved compared with the conventional projection cathode ray tube as evidenced by the relation of a relative initial luminance to a concentration of a light-emitting substance containing $Tm^{3+}$ shown in FIG. 10.

Table 4 shown below indicates a degree of decline in a luminance after the projection cathode ray tube is driven for about 5000 hours. A degree of decline in a luminance of the conventional projection cathode ray tube was assumed to be 1. The degree of decline in a luminance could be reduced as shown in Table 4 according to a concentration of added $Tm^{3+}$ after the projection cathode ray tube was driven for about 5000 hours. It is desirable to set the concentration of the light-emitting substance containing $Tm^{3+}$ to about 10 mol % or less such that transparency can be maintained. As it is seen from FIG. 10 and Table 4, it is more desirable to set the concentration of the light-emitting substance containing $Tm^{3+}$ in a range of about 3 mol % to about 10 mol % at which a higher effect is obtained.

TABLE 4

|  | Specifications of light-emitting glass |  |  |  |  | Conventional face plate |
|---|---|---|---|---|---|---|
| $Tm^{3+}$ concentration (mol %) | 1 | 3 | 5 | 7 | 10 | None |
| Degree of decline in luminance (relative value) | 0.90 | 0.87 | 0.85 | 0.85 | 0.87 | 1.00 |

Seventh Embodiment

A light-emitting glass layer added with about 5 mol % of $Tb^{3+}$ was formed with a thickness of about 50 μm on the inner surface of the face plate 2 of glass, which was used in the projection cathode ray tube, by the sol-gel method.

Thereafter, a surface of the formed light-emitting glass layer is grinded to form an uneven surface intentionally. This uneven surface is formed to control total reflection of light in the light-emitting glass layer. When total reflection of light occurs in the light-emitting glass layer, it is impossible to emit light to the front of the face plate. The formation of the uneven surface makes it easy to guide light to the front of the face plate.

By forming the uneven surface, an initial luminance of the manufactured projection cathode ray tube could be improved to about 1.06 times as high as the conventional projection cathode ray tube. When a degree of decline in a luminance of the conventional projection cathode ray tube was assumed to be 1, a degree of decline in a luminance after the projection cathode ray tube was driven for about 5000 hours could be reduced to about 0.85 times as high as the degree of decline in a luminance of the conventional projection cathode ray tube.

Eighth Embodiment

Figure 11:
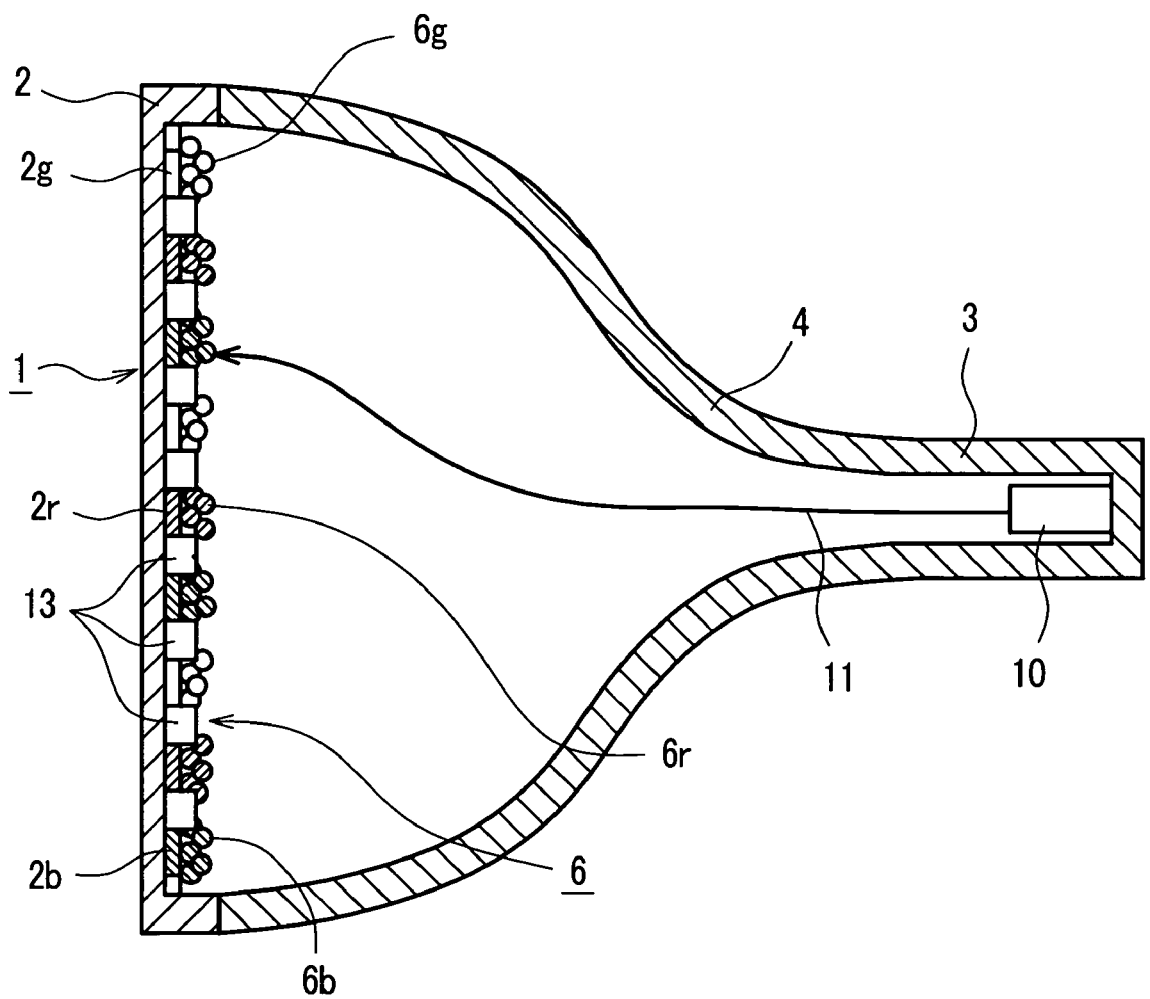
FIG. 11 is a main part sectional view showing a structure of a direct-view cathode ray tube according to an eighth embodiment of the display apparatus according to the invention.

FIG. 11 is a main part sectional view schematically illustrating a structure of a cathode ray tube according to an eighth embodiment of the display apparatus according to the invention. In FIG. 11, components identical with those in FIG. 5 are denoted by the identical reference numerals and signs and explanations of the components are omitted. In this embodiment, the cathode ray tube has three kinds of light-emitting substances in an inner surface of a face plate. In the inner surface of the face plate 2, light-emitting glass layers 2g, 2r, and 2b were formed. The light-emitting layers 2g, 2r, and 2b were obtained by implanting $Tb^{3+}$ in a face plate portion that is in contact with a predetermined position, where green phosphors 6g were formed in a later process, $Eu^{3+}$ in a face plate portion that is in contact with a predetermined position, where red phosphors 6r were formed in the later process, and $Tm^{3+}$ in a face plate portion that is in contact with a predetermined position, where blue phosphors 6b were formed, respectively, by the ion implantation method.

In other words, the green phosphors 6g are formed on the light-emitting glass layer 2g containing $Tb^{3+}$, the red phosphors 6r are formed on the light-emitting glass layer 2r containing $Eu^{3+}$, and the blue phosphors 6b are formed on the light-emitting glass layer 2b containing $Tm^{3+}$.

Black matrix films 13 and fluorescent films 6 of three colors were formed in predetermined positions on the inner surface of the face plate 2 by a slurry method, respectively. Note that ZnS:Cu, Al was used for the green phosphors 6g, $Y_2O_2S$: Eu was used for the red phosphors 6r, and ZnS:Ag was used for the blue phosphors 6b. After a process for forming a filming film, the aluminum evaporated film 8, and the like, the funnel section 4 was joined to the face plate 2 to manufacture a 21 inch direct-view cathode ray tube.

The direct-view cathode ray tube manufactured in this way and a conventional cathode ray tube were driven under conditions of an acceleration voltage of about 27.5 kV, an electron beam irradiation area of 400×300 mm² (21 inch raster), and a total electric current of three colors of about 600 μA. An initial luminance of the direct-view cathode ray tube manufactured in this embodiment was about 1.03 times as high as an initial luminance of the conventional cathode ray tube. When a degree of decline in a luminance of the conventional cathode ray tube was assumed to be 1, a degree of decline in a luminance of the direct-view cathode ray tube after being driven for about 5000 hours could be reduced to about 0.85 times as high as the degree of decline in a luminance of the conventional projection cathode ray tube.

Ninth Embodiment

Figure 12:
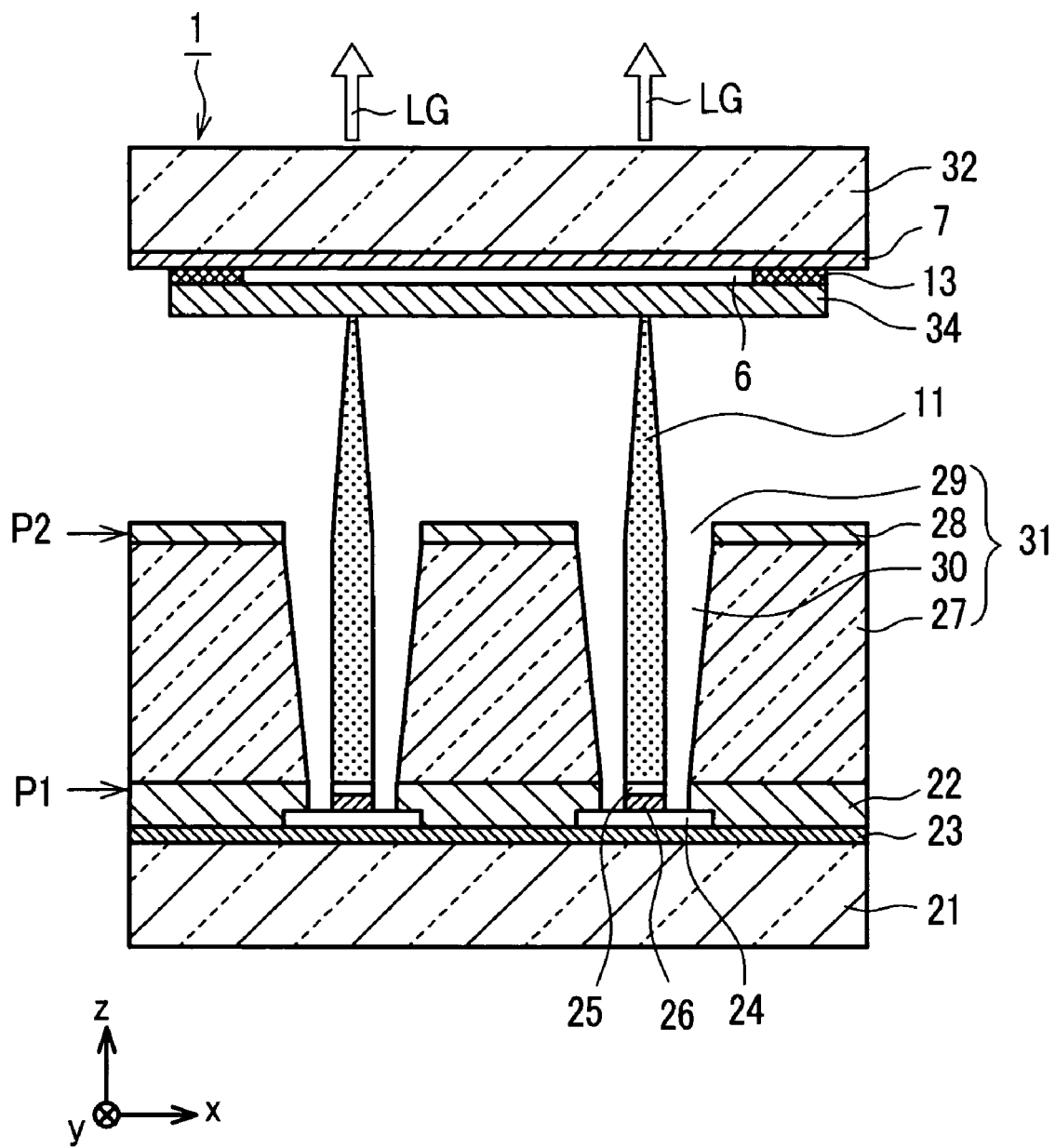
FIG. 12 is a main part enlarged sectional view showing a structure of a flat image display apparatus of a field emission type according to a ninth embodiment of the display apparatus according to the invention.
Figure 13:
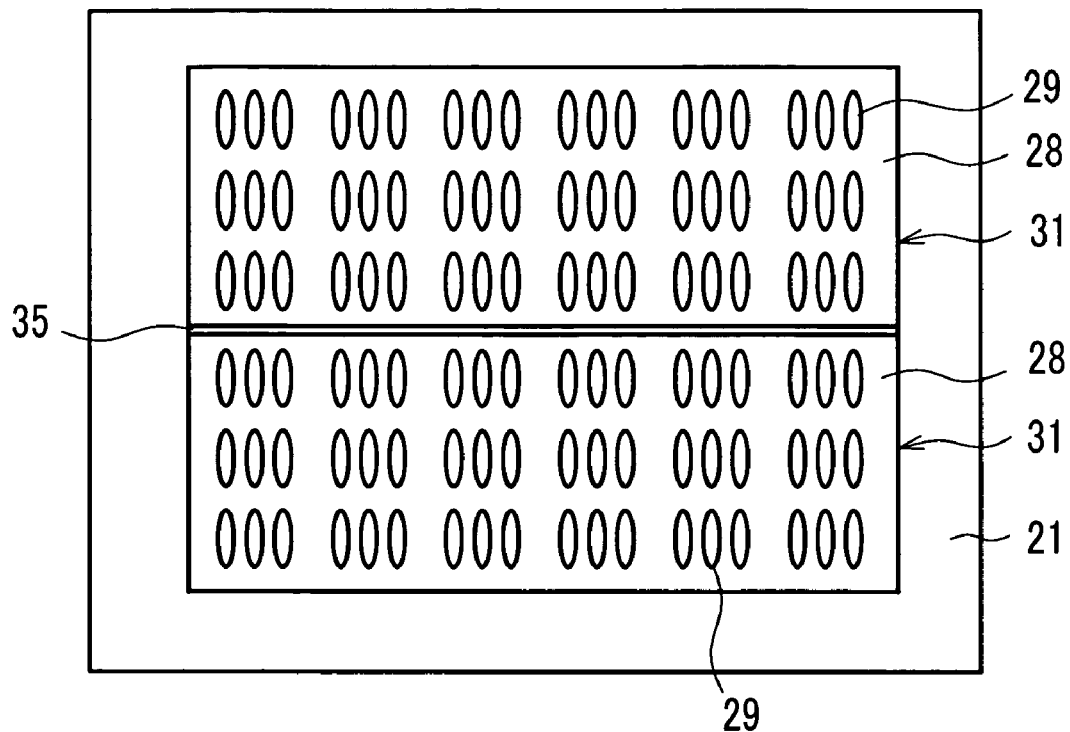
FIG. 13 is a plan view of a second control electrode shown in FIG. 12 viewed from a position above the second control electrode.

FIG. 12 is a main part enlarged sectional view of a flat image display apparatus having an electron beam excitation fluorescent screen illustrating a structure according to a ninth embodiment of the display apparatus according to the invention. In FIG. 12, functional components identical with those in the figures referred to above are denoted by the identical reference numerals and signs and explanations of the functional components are omitted. In FIG. 12, reference numeral 21 denotes a back substrate; 22, a first control electrode; 23, a first control electrode line that feeds power to the first control electrode 22; 24, a lower insulating layer; 25, cathodes serving as electron sources; 26, cathode lines; 27, a tabular upper insulating layer; 28, a second control electrode (a focusing electrode); 29, openings for electron passage formed in an elliptical shape in the second control electrode 28; 30, openings for electron passage formed in an elliptical shape in the upper insulating layer 27; 31, an integral second control electrode structure; 32, a front substrate equivalent to a translucent panel glass; and 34, an anode consisting of an aluminum evaporated film. Note that reference sign P1 denotes a first plane parallel to the back substrate 21 and P2 denotes a second plane parallel to the back substrate 21.

The flat panel display apparatus according to this embodiment has plural cathode lines 26 that extend in a first direction (a y direction) on the first plane P1 on a main surface of the back substrate 21, which is preferably made of a glass or ceramic material, and are provided side by side in a second direction (an x direction) crossing the first direction. On the cathode lines 26, the cathodes 25 serving as electron sources are formed in positions that change to respective pixels (color sub-pixels in the case of color display). In addition, the first control electrode 22 is provided in parallel to the cathode lines 26 on the identical surface as the cathode lines 26 to sandwich at least the parts of the cathodes 25 of the cathode lines 26 on the first plane P1. The first control electrode 22 pierces through the lower insulating layer 24 to be electrically connected to the first control electrode line 23

The second control electrode 28 is set on the second plane P2 that is located in an upper layer of the first control electrode 22 and parallel to the first plane P1. The second control electrode 28 is insulated from the first control electrode 22 by the upper insulating layer 27 that is formed between the second control electrode 28 and the first plane P1. The second control electrode 28 is formed to have the openings 29, through which the electron beam 11 is passed, in portions corresponding to the respective pixels and cover a position above the first control electrode 22. The openings 29 have a size enough for exposing the cathodes 25 formed in the first plane P1 and parts of the first control electrode 22 adjacent to the cathodes 25. Note that the upper insulating layer 27 is formed excluding the cathodes 25 formed in the first plane P1 and the parts of the first control electrode 22 adjacent to the cathodes 25.

Electron beam sources for the respective pixels are formed in portions where the cathode lines 26 having the cathodes 25 and the first control electrode line 23 cross. The cathode lines 26 have lead lines at least in one side around the back substrate 21 and the first control electrode line 23 connected to the first control electrode 22 has lead lines at least another side around the back substrate 21. A video signal voltage and a control voltage are supplied to the cathode lines 26 and the first control electrode line 23 via these lead lines. The second control electrode 28 constitutes a so-called focusing electrode. A focusing voltage is supplied to the second control electrode 28 from a not-shown lead line provided outside a display area of a front substrate to be described later.

On the other hand, the front substrate 32 is stuck to the back substrate 21 with a predetermined interval provided in a z direction by a not-shown sealing frame. The front substrate 32 has visible light transmission properties equivalent to those of the face plate 2G in FIG. 1 and is formed by a molded product of a light-emitting glass material added with a light-emitting substance containing $Tb^{3+}$ that emits light by itself when the electron beam 11 is projected thereon. The front substrate 32 is formed according to integral molding by adding about 5 mol % of the light-emitting substance containing $Tb^{3+}$ in a glass material that is usually used in a manufacturing step of the substrate. By adding the light-emitting substance containing $Tb^{3+}$, the front substrate 32 presents green light emission LG according to projection of the electron beam 11.

On the inner surface of the face plate 2, the reflection film 7 consisting of, for example, an evaporated film of bismuth oxide ($Bi_{2\,O3}$) with an average thickness of about 0.2 µm, the fluorescent film 6 consisting of green light-emitting phosphors sectioned by the black matrix films 13, and the anode 34 are formed. The back substrate 21 and the front substrate 32 are held at the predetermined interval and an inside of a space between the back substrate 21 and the front substrate 32 is sealed in a vacuum.

In the flat panel display apparatus constituted as described above, by supplying a video signal voltage to the cathode lines 26 and supplying a scanning signal voltage to the first control electrode 22, the electron beam 11 corresponding to a magnitude of the video signal voltage is extracted from the cathodes 25 serving a selectron sources formed in the portions where the cathode lines 26 and the first control electrode 22 cross. The extracted electron beam 11 is subjected to a focusing action by a focusing voltage (a DC voltage) supplied to the second control electrode 28, directed to the front substrate 32 by a high voltage supplied to the anode 34 formed in the front substrate 32, and excites the fluorescent film 6 to emit light at a predetermined wavelength. In particular, efficiency of use of electron beams is improved in the case in which an electron beam source in an in-plane-gate (IPG) structure is used and it is possible to obtain an image display of a high luminance.

In the flat panel display apparatus constituted as described above, by adding $Tb^{3+}$ in the front substrate 32 and using green light-emitting phosphors in the fluorescent film 6, an amount of light emission increases according to green light emission by energy of the electron beam 11 colliding against the fluorescent film 6 and green light emission by energy of the electron beam 11 colliding against the front substrate 32. It is possible to reduce the browning that occurs in the front substrate 32 and improve brightness of a display image in the plane image display apparatus significantly by extracting energy of the electron beam 11 injected in the face plate 2. Although the reflection film 7 is not always necessary, the effect of controlling the browning is increased by forming the reflection film 7 on a light-emitting glass layer.

Note that, in the explanation of the embodiment described above, the invention is applied to the flat panel display apparatus using a fluorescent film consisting of green light-emitting phosphors. The invention may be applied to a flat panel display apparatus using red light-emitting phosphors, blue light-emitting phosphors, or three color light-emitting phosphors. In this case, $Eu^{3+}$ and $Tm^{3+}$ to be added are used in combination in association with a light emission color of phosphors to be used.

Figure 14:
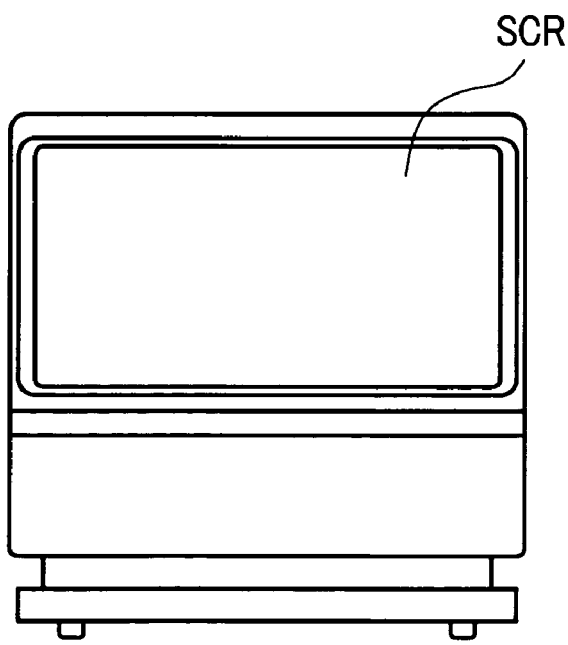
FIG. 14 is a front view illustrating an example of a video display apparatus using a projection cathode ray tube according to the invention.
Figure 15:
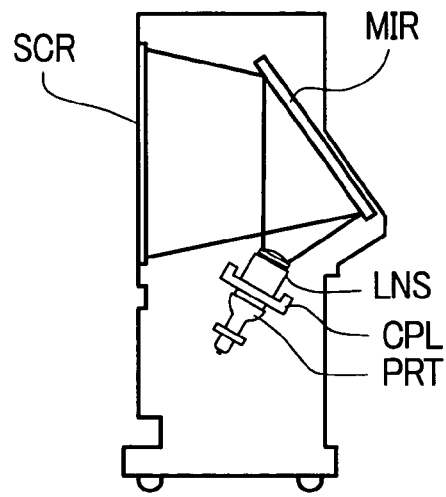
FIG. 15 is an explanatory diagram showing an example of an internal arrangement of the video display apparatus in FIG. 14.
Figure 16:
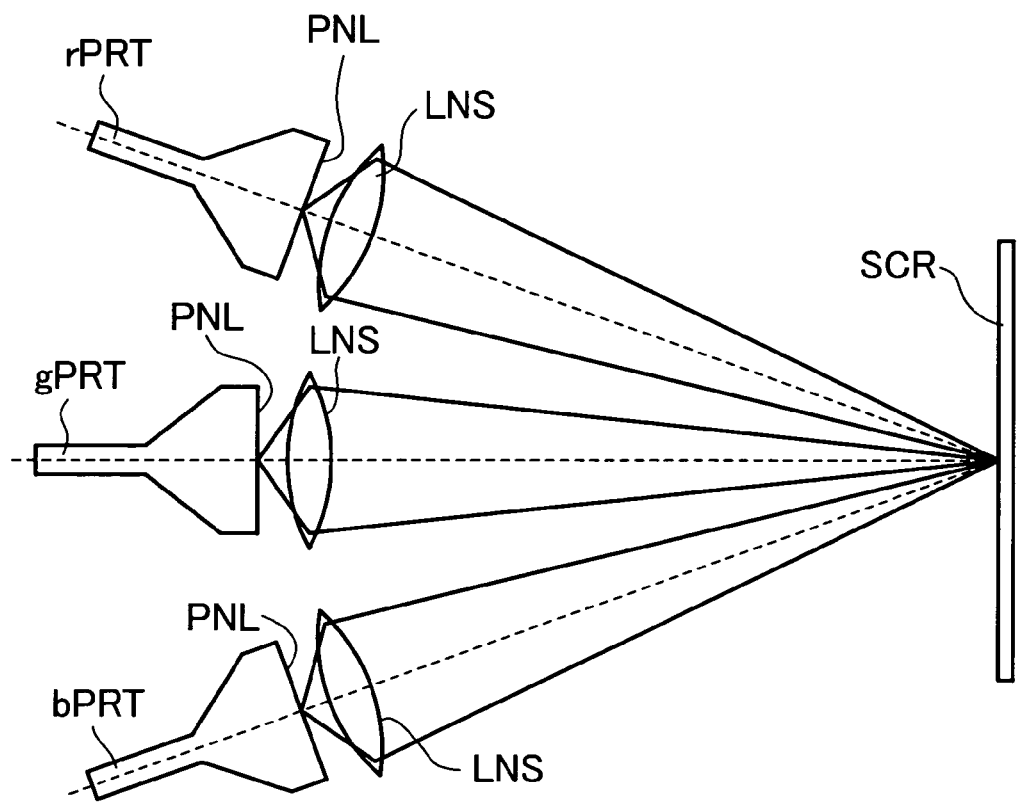
FIG. 16 is a schematic diagram illustrating an example of an arrangement of optical systems of a color projector.

FIG. 14 is a front view illustrating an example of a video display apparatus that uses the projection cathode ray tube shown in FIG. 1 as the display apparatus according to the invention. FIG. 15 is an explanatory diagram of an example of an internal arrangement of the video display apparatus in FIG. 14. The video display apparatus shown in FIGS. 14 and 15 is a so-called projection television receiver. The video display apparatus houses a projection cathode ray tube for red rPRT, a projection cathode ray tube for green gPRT, a projection cathode ray tube for blue bPRT, projection lenses LNS, and a reflection mirror MIR as shown in FIG. 16. Note that reference numeral CPL denotes a coupling for attaching the projection lens LNS to the projection cathode ray tube PRT.

Color videos of the respective primary colors formed on phosphor layers of panel glasses PNL of the three projection cathode ray tubes PRT are projected on a screen SCR by the projection lenses LNS and the reflection mirror MIR. The projected color videos of the respective primary colors are synthesized on the screen SCR at the time of the projection, whereby a color video is reproduced. Note that the video display apparatus shown in FIGS. 14 and 15 are only an example, in which the projection cathode ray tubes PRT is separated from the screen SCR as a separate apparatus.

According to the display apparatus of the invention, it is possible to extract electron beam energy, which is injected into the face plate by electron beam projection, as a light emission color. It is also possible to reduce damages to the face plate caused by electron beams. By using a light emission color of the face plate and a light emission color of the phosphor layer as colors for display, an amount of light emission increases. Consequently, since it is possible to reduce an amount of projection of electron beams, a burden on the phosphor layer is reduced and it is possible to improve a product life significantly. Since it is possible to use the light emission color of the face plate as a color for display together with a light emission color from phosphors, extremely excellent advantages are realized. For example, a sufficient luminance is obtained even if electron beams are projected on the face plate for a long time.

What is claimed is:

1. A display apparatus comprising:
   a vacuum envelope that has a light transmissive face plate;
   a phosphor layer formed on an inner surface of the face plate; and
   an electron beam source that is housed in the vacuum envelope and emits electron beams to the phosphor layer, wherein
   the face plate includes a light-emitting glass layer added with a light-emitting substance that emits light when the electron beams are projected thereon.

2. A display apparatus according to claim 1, wherein a concentration of ions to be a light emission center is high on a side close to a side of formation of the phosphor layer in the face plate.

3. A display apparatus according to claim 1, wherein a light emission area of the face plate is within 50 µm from an inner surface of the face plate to a front surface of the face plate.

4. A display apparatus according to claim 1, wherein the light-emitting substance added to the face plate is $Eu^{3+}$ and the phosphor layer is constituted by red light-emitting phosphors.

5. A display apparatus according to claim 1, wherein the light-emitting substance added to the face plate is $Tb^{3+}$.

6. A display apparatus according to claim 1, wherein the light-emitting substance added to the face plate is $Tm^{3+}$.

7. A display apparatus according to claim 1, wherein an uneven surface is provided on the inner surface of the face plate.

8. A display apparatus according to claim 1, wherein a light emission color of a light-emitting portion of the face place corresponds to a light emission color of the phosphor layer.

9. A display apparatus according to claim 1, wherein the display apparatus is a projection cathode ray tube.

10. A display apparatus according to claim 1, wherein the display apparatus is a field emission display apparatus.

* * * * *